(12) United States Patent
Fukute

(10) Patent No.: US 6,774,203 B1
(45) Date of Patent: Aug. 10, 2004

(54) METHOD FOR PRODUCING LIQUID CRYSTALLINE POLYESTER

(75) Inventor: Yasuyuki Fukute, Fuji (JP)

(73) Assignee: Polyplastics Co., Ltd., Tokyo (JP)

( * ) Notice: Subject to any disclaimer, the term of this patent is extended or adjusted under 35 U.S.C. 154(b) by 0 days.

(21) Appl. No.: 10/130,354

(22) PCT Filed: Nov. 17, 2000

(86) PCT No.: PCT/JP00/08122

§ 371 (c)(1), (2), (4) Date: May 17, 2002

(30) Foreign Application Priority Data

Nov. 18, 1999 (JP) ............................................ 11/328783

(51) Int. Cl.⁷ ............................................ C08G 63/00
(52) U.S. Cl. ...................... 528/176; 528/179; 528/190; 528/193; 528/194; 528/206; 528/212; 528/274; 528/298; 528/302; 528/308; 528/308.6
(58) Field of Search ................................. 528/176, 179, 528/190, 193, 194, 206, 212, 274, 298, 302, 308, 308.6

(56) References Cited

U.S. PATENT DOCUMENTS 5,079,289 A * 1/1992 Layton et al. ............... 524/600
6,296,930 B1 * 10/2001 Ohbe et al. ............... 428/304.4

FOREIGN PATENT DOCUMENTS

| JP | 62-267323 | 11/1987 |
| JP | 63-36633 | 7/1988 |
| JP | 63-284221 | 11/1988 |
| JP | 64-33123 | 2/1989 |
| JP | 1-230629 | 9/1989 |
| JP | 4-225021 | 8/1992 |
| JP | 7-10975 | 1/1995 |
| JP | 10-36492 | 2/1998 |

* cited by examiner

*Primary Examiner*—Samuel A. Acquah
(74) *Attorney, Agent, or Firm*—Nixon & Vanderhye P.C.

(57) ABSTRACT

The present invention provides a method for producing a liquid crystalline polyester which is produced from an aromatic carboxylic acid, an aromatic hydroxycarboxylic acid, an aromatic diol and/or an aromatic hydroxylamine, including a polymerization step (1) for producing a prepolymer of the liquid crystalline polyester and a solid-state polymerization step (2) for elevating the polymerization degree of the resultant prepolymer, the number of aromatic ring terminal groups of the prepolymer satisfying the following equation (i): [(the number of aromatic ring terminal groups)/[(the number of carboxylic terminal groups)+(the number of aromatic ring terminal groups)]]×100≧7(%) (i). According to the invention, all-aromatic type liquid crystalline polyesters can be produced within a short time and at low cost.

10 Claims, No Drawings

METHOD FOR PRODUCING LIQUID CRYSTALLINE POLYESTER

This application is the U.S. national phase of international application PCT/JP00/08122 filed Nov. 17, 2000 which designated the U.S.

TECHNICAL FIELD

The present invention relates to a method for producing a liquid crystalline polyester, especially an all-aromatic type liquid crystalline polyester, endowed with excellent mechanical characteristics and heat resistance, and more particularly, to a method for producing a liquid crystalline polyester comprising performing two-stage polymerization, i.e., melt polymerization for producing a prepolymer and solid-state polymerization, wherein solid-state polymerization is performed after completion of control of the number of aromatic ring terminal groups contained in the prepolymer to be present at a ratio not less than a predetermined value.

BACKGROUND ART

Recent years have seen increasing demand for a material having excellent rigidity, strength, and heat resistance regardless of whether the material is in the form of fiber, film, or in the form of a molded product. Polyester has already found a wide range of uses in ordinary molded products. However, most polyesters are not suited for uses requiring high modulus and strength, in view of its poor modulus and strength.

All-aromatic type liquid crystalline polyesters are endowed with excellent properties; particularly, remarkable heat resistance, by virtue of the structural characteristics thereof. Among them, aromatic polyesters prepared from at least terephthalic acid or isophthalic acid; p-hydroxybenzoic acid or its derivatives; and 4,4'-dihydroxydiphenyl or its derivatives are known to be injection-moldable resins endowed with a variety of important properties (required performance) for use as plastic products; e.g., excellent mechanical and electrical properties, high heat resistance, high resistance to chemicals, oil, and radiation, and dimensional stability.

The all-aromatic type polyesters are produced through condensation-polymerization (also called polycondensation) of, for example, an aromatic hydroxycarboxylic acid, or an aromatic diol and an aromatic dicarboxylic acid. Some of the above polyesters have an amino-group-containing aromatic unit in the skeleton thereof. The bond between aromatic units in the polyesters is an ester bond formed from, for example, a carboxylic group contained in an aromatic compound and a phenolic hydroxyl group. However, formation of the ester bond through direct dehydration-condensation of the carboxylic group and the phenolic hydroxyl group is usually difficult.

One possible method to overcome the difficulty has been disclosed (Japanese Patent Application Laid-Open (kokai) Nos. 64-33123 and 63-284221). Specifically, the phenolic hydroxyl group is acylated in advance by use of an aliphatic carboxylic acid anhydride such as acetic anhydride, to thereby form an aromatic compound; e.g., p-acetoxybenzoic acid, and the thus-formed aromatic compound serving as a raw material undergoes transesterification with an aromatic carboxylic acid while the by-produced aliphatic carboxylic acid is removed through distillation, to thereby produce a polyester.

Japanese Patent Application Laid-Open (kokai) Nos. 62-267323, 1-230629, and 7-10975 disclose another method for synthesizing a liquid crystalline polyester containing an aliphatic polyester, which method includes adding an aliphatic carboxylic acid anhydride (e.g., acetic anhydride) in an amount of 0.01–0.5 times to total phenolic hydroxyl group equivalent and reacting with an aromatic carboxylic acid.

These liquid crystalline polyesters are produced through any of known polymerization methods, such as melt polymerization, solid-state polymerization, and suspension polymerization. Generally, polymers for which high heat resistance is required are produced through solid-state polymerization. However, solid-state polymerization must be carried out at a temperature lower than the heat distortion temperature or the melting point of a target polymer, inevitably causing problematic retardation in rate of polymerization as compared with polymerization at a molten state; i.e., melt polymerization.

Thus, solid-state polymerization requires a longer period of time for completion of polymerization as compared with melt polymerization, and there still remains an unsolved question "how to shorten the reaction time" in relation to solid-state polymerization.

DISCLOSURE OF THE INVENTION

The present inventors have carried out extensive studies so as to solve the aforementioned problem, and have found that regulating the terminal group composition of the prepolymer can enhance the rate of solid-state polymerization for producing a prepolymer, or shorten the polymerization time, without deteriorating heat resistance or hue of the produced polymer. The present invention has been accomplished on the basis of this finding.

Accordingly, in a first mode of the present invention, there is provided a method for producing a liquid crystalline polyester comprising at least an aromatic carboxylic acid (A) and a compound having a hydroxyl group (B) and exhibits anisotropy when stationary in a molten state, wherein the method comprises a polymerization step (1) for producing a prepolymer of the liquid crystalline polyester so as to satisfying the following equation (i);

[(the number of aromatic ring terminal groups)/[(the number of carboxylic terminal groups)+(the number of aromatic ring terminal groups)]]×100≧7(%)    (i), and a solid-state polymerization step (2) for elevating the polymerization degree of the resultant prepolymer, In a second mode of the present invention, there is provided a method for producing a liquid crystalline polyester as described in the first mode, wherein the aromatic carboxylic acid (A) is an aromatic dicarboxylic acid (a) and/or an aromatic hydroxycarboxylic acid (c), and the compound having a hydroxyl group (B) is an aromatic diol (b), an aromatic hydroxycarboxylic acid (c), and/or an aromatic hydroxylamine (d).

In a third mode of the present invention, there is provided a method for producing a liquid crystalline polyester as described in the first or second mode, wherein the aromatic hydroxycarboxylic acid (c) is p-hydroxybenzoic acid and/or 2-hydroxy-6-carboxynaphthalene.

In a fourth mode of the present invention, there is provided a method for producing a liquid crystalline polyester as described in any one of the first to third modes, wherein the liquid crystalline polyester is a liquid crystalline all-aromatic type polyester including at least p-hydroxybenzoic acid.

In a fifth mode of the present invention, there is provided a method for producing a liquid crystalline polyester as described in any one of the first to fourth modes, wherein polymerization for producing the prepolymer is performed by employing an aliphatic carboxylic acid anhydride (E) in an amount of 1.02–1.08 times to hydroxyl group equivalent of a phenolic-hydroxyl-group-containing aromatic compound.

In a sixth mode of the present invention, there is provided a method for producing a liquid crystalline polyester as described in the fifth mode, wherein the aliphatic carboxylic acid anhydride (E) is acetic anhydride.

In a seventh mode of the present invention, there is provided a method for producing a liquid crystalline polyester as described in any one of the first to sixth modes, wherein polymerization for producing the prepolymer is performed in the presence of a metallic catalyst in an amount of 200 ppm or lower by weight as reduced to a metallic element based on the prepolymer.

In an eighth mode of the present invention, there is provided a method for producing a liquid crystalline polyester as described in any one of the first to seventh modes, wherein the prepolymer has an intrinsic viscosity $[\eta]$, as measured in pentafluorophenol at 60° C., of 0.2–3.0 dl/g.

In a ninth mode of the present invention, there is provided a method for producing a liquid crystalline polyester as described in any one of the first to eighth modes, wherein the solid-state polymerization step (2) is performed at 200–400° C.

In a tenth mode of the present invention, there is provided a method for producing a liquid crystalline polyester as described in any one of the first to ninth modes, wherein the liquid crystalline polyester has an intrinsic viscosity $[\eta]$, as measured in pentafluorophenol at 60° C., of 2.0–10.0 dl/g.

In an eleventh mode of the present invention, there is provided a method for producing a liquid crystalline polyester as described in any one of the first to ninth modes, wherein the polymerization step for producing a prepolymer of the liquid crystalline polyester (1) further comprises, after polymerization, a maturing step for controlling the number of aromatic ring terminal groups so as to satisfy the equation (i) while the intrinsic viscosity $[\eta]$ of the prepolymer, as measured in pentafluorophenol at 60° C., is maintained at 0.2–3.0 dl/g and subsequently, the solid-state polymerization step (2) is performed.

In a twelfth mode of the present invention, there is provided a method for producing a liquid crystalline polyester as described in the eleventh mode, wherein the maturing step is performed while agitation is weakened or stopped within a 20° C. temperature range centered on a final polymerization temperature for producing the prepolymer (i.e., final polymerization temp. ±10° C.); and under reduced pressure, normal pressure or a pressurized condition, or a gas flow at any pressure.

BEST MODES FOR CARRYING OUT THE INVENTION

Modes for carrying out the present invention will next be described.

The liquid crystalline polyester of the present invention is a melt-processable polyester whose polymer chains are regularly arranged in parallel in a molten state. The state in which polymer molecules are arranged in the above manner is generally called a liquid crystalline state or a nematic phase of a liquid crystalline substance. Such a polymer molecule is usually thinly-long and flat and has considerably high rigidity along the long axis of the molecule. Generally, the polymer molecule has a plurality of chain-extension bonds coaxial to or in parallel to the molecular axis.

Properties of an anisotropic molten phase can be confirmed through a routine method; i.e., observation with a polarizing microscope having a rectangular cross polarizers. Specifically, the anisotropic molten phase is identified through observation, with a Leitz polarizing microscope, of a molten sample placed on a Leitz hot stage in a nitrogen atmosphere at a magnification of ×40. Upon observation of a sample placed between the rectangular cross polarizers, the polymer of the present invention allows polarized light to pass therethrough and exhibits optical anisotropy, even when the polymer is stationary in a molten phase.

Since preferable liquid crystalline polymers of the present invention tend to be insoluble in an ordinary solvent, processing in a solution state is not advantageous. However, as mentioned above, these polymers can be readily processed through a typical melt processing method.

The liquid crystalline polyester of the present invention is preferably an aromatic polyester or an aromatic polyester-amide, and may be a polymer containing an aromatic polyester fragment or an aromatic polyester-amide fragment in a single molecular chain.

Among such polyesters, particularly preferred are aromatic liquid crystalline polyesters and aromatic liquid crystalline polyester-amides which are prepared from at least one compound selected from an aromatic hydroxycarboxylic acid, an aromatic hydroxylamine, and an aromatic diamine.

More specific examples of the liquid crystalline polyester of the present invention include (1) a polyester prepared from, as a predominant raw material, one or more species selected from among an aromatic hydroxycarboxylic acid (c) and/or derivatives thereof;

(2) a polyester prepared from, as a predominant raw material, one or more species selected from among an aromatic hydroxycarboxylic acid (c) and/or derivatives thereof; one or more species selected from among an aromatic dicarboxylic acid (a), an aliphatic dicarboxylic acid (a'), and/or derivatives thereof; and one or more species selected from among an aromatic diol (b), an alicyclic diol (b'), and an aliphatic diol (b"), and/or derivatives thereof;

(3) a polyester-amide prepared from, as a predominant raw material, one or more species selected from among an aromatic hydroxycarboxylic acid (c) and/or derivatives thereof; one or more species selected from among an aromatic hydroxylamine (d), an aromatic diamine (d'), and/or derivatives thereof; and one or more species selected from an aromatic dicarboxylic acid (a), an alicyclic dicarboxylic acid (a'), and/or derivatives thereof; and (4) a polyester-amide prepared from, as a predominant raw material, one or more species selected from among an aromatic hydroxycarboxylic acid (c) and/or derivatives thereof; one or more species selected from among an aromatic hydroxylamine (d), an aromatic diamine (d'), and/or derivatives thereof; and one or more species selected from an aromatic dicarboxylic acid (a), an alicyclic dicarboxylic acid (a'), and/or derivatives thereof; and one or more species selected from among an aromatic diol (b), an alicyclic diol (b'), and an aliphatic diol (b"), and/or derivatives thereof.

In addition to the aforementioned raw materials, molecular weight modifier such as mono-functional monomers; e.g., benzoic acid and tri-functional monomers; e.g., an aromatic hydroxydicarboxylic acid and an aromatic tricarboxylic acid may be employed in combination in accordance with needs.

Examples of preferred monomers for preparing the liquid crystalline polyester of the present invention include
(i) naphthalene compounds such as 2,6-naphthalenedicarboxylic acid, 2,6-dihydroxynaphthalene, 1,4-dihydroxynaphthalene, and 6-hydroxy-2-naphthoic acid;
(ii) biphenyl compounds such as 4,4'-diphenyldicarboxylic acid and 4,4-dihydroxybiphenyl;
(iii) compounds represented by the following formulae (I), (II), and (III):

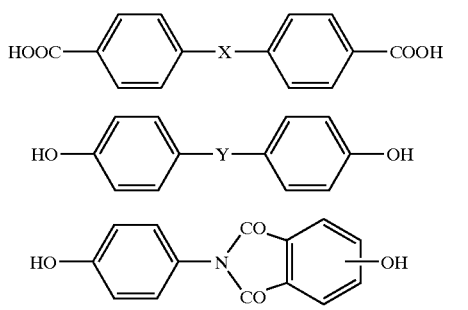

(wherein X represents a group selected from among a C1–C4 alkylene or alkylidene group, —O—, —SO—, —SO$_2$—, —S—, and —CO—; and Y represents a group selected from among —(CH$_2$)$_n$— (n=1–4), —O(CH$_2$)$_n$O— (n=1–4), —O—, —SO—, —SO$_2$—, —S—, and —CO—);
(iv) p-substituted benzene compounds such as p-hydroxybenzoic acid, terephthalic acid, hydroquinone, p-aminophenol, and p-phenylenediamine, and nucleus-substituted benzene compounds thereof (nucleus substituents being selected from chlorine, bromine, a C1–C4 alkyl, phenyl, and 1-phenylethyl); and
(v) m-substituted benzene compounds such as isophthalic acid and resorcin, and nucleus-substituted benzene compounds thereof (nucleus substituents being selected from chlorine, bromine, a C1–C4 alkyl, phenyl, and 1-phenylethyl).

Among the aforementioned monomers, liquid crystalline polyesters prepared from at least one or more species selected from among naphthalene compounds, biphenyl compounds, and p-substituted benzene compounds are more preferred as the liquid crystalline polyester of the present invention.

Among the p-substituted benzene compounds, p-hydroxybenzoic acid, methylhydroquinone, and 1-phenylethylhydroquinone are particularly preferred.

In addition to the aforementioned monomers, the liquid crystalline polyester of the present invention may contain, in a single molecular chain thereof, a polyalkylene tetrphthalate fragment which does not exhibit an anisotropic molten phase. In this case, the alkyl group has 2–4 carbon atoms.

Specific examples of compounds having an ester-formable functional group and those of liquid crystalline polyesters that can be produced by the method of the present invention are disclosed in Japanese Patent Publication (kokoku) No. 63-36633.

The liquid crystalline polyester of the present invention generally has a weight average molecular weight of approximately 2,000–200,000, preferably approximately 10,000–50,000, particularly preferably approximately 20,000–30,000.

The liquid crystalline polyester-amide of the present invention generally has a weight average molecular weight of approximately 5,000–50,000, preferably approximately 10,000–30,000, particularly preferably approximately 15,000–17,000.

Generally, the aforementioned aromatic polyester and polyester-amide have an intrinsic viscosity [η] of at least approximately 2.0 dl/g; specifically, approximately 2.0–10.0 dl/g, when each polymer is dissolved in pentafluorophenol at 60° C. so as to attain a concentration of 0.1 wt. %.

Throughout the present specification, the intrinsic viscosity [η] refers to an intrinsic viscosity as measured in pentafluorophenol at 60° C.

The molecular weight can be measured through methods such as terminal group analysis employing amine decomposition; gel permeation chromatography; and a light scattering method using a pentafluorophenol sample solution; as well as other standard measurement methods that do not employ a polymer solution, such as infrared spectrometric terminal group determination using compression-molded film samples.

Taking as an example a all-aromatic type liquid crystalline polyester, the types of terminal groups which can be quantitatively determined include the following:

carboxylic terminal group: (polymer chain) —ϕ—COOH;
aromatic ring terminal group: (polymer chain) —ϕ; and
phenolic hydroxyl terminal group: (polymer chain) —ϕ—OH;

(wherein ϕ represents a benzene ring or a naphthalene ring; and in (polymer chain) —ϕ a substituent other than (polymer chain)—is connected to ϕ at the p- or m-position in the case in which ϕ is a benzene ring and to the 1,4-, 1,5-, or 2,6-positions in the case in which ϕ (is a naphthalene ring).

Examples of the aliphatic carboxylic acid anhydride which is used in the present invention include lower (C≦10) aliphatic carboxylic acid anhydrides such as acetic anhydride and propionic anhydride. Of these, acetic anhydride is most commonly used, in view of costs and handling.

In the present invention, in order to acylate hydroxyl groups, particularly phenolic hydroxyl groups, of the aforementioned hydroxyl-group-containing monomers; i.e., an aromatic diol (b), an alicyclic diol (b'), an aliphatic diol (b"), an aromatic hydroxycarboxylic acid (c), and an aromatic hydroxylamine (d), upon production of a prepolymer, the aliphatic carboxylic acid anhydride (E) is used in an amount of 1.02–1.08, preferably 1.02–1.06 times to hydroxyl group equivalent of the aforementioned hydroxyl-group-containing compounds, particularly phenolic-hydroxyl-group-containing aromatic compounds.

When the aliphatic carboxylic acid anhydride (E) is used in an amount less than 1.02 to hydroxyl group equivalent, the equilibrium at acylation is shifted to the aliphatic carboxylic acid anhydride side and raw materials such as the compound (B) having a hydroxyl group sublimate during polymerization for producing a liquid crystalline polyester. In this case, the reaction system tends to be clogged and polycondensation proceeds insufficiently. When the amount exceeds 1.08 times to hydroxyl group equivalent, the produced polyester tends to be heavily colored, and characteristics of the resin obtained from the polyester are deteriorated. Both cases are disadvantageous.

Preferably, polymerization for producing a prepolymer is performed at approximately 150° C. to 400° C., more preferably approximately 250° C. to 370° C., under normal pressure or reduced pressure in an inert gas atmosphere. The polymerization temperature may be appropriately elevated during polymerization, and the rate of temperature elevation is preferably regulated in accordance with the properties of the monomers employed.

In the present invention, the polymerization step (1) for producing a prepolymer (hereinafter referred to as prepolymer production step) and the below-mentioned subsequent solid-state polymerization step (2) can also proceed in the absence of a catalyst.

When these polymerization steps are carried out in the absence of a catalyst, no catalyst residue is generated, thereby leading to advantageous omission of a post-treatment of the produced polymer.

However, an organic amine catalyst or a gas-form non-metallic catalyst such as Lewis acid; e.g., hydrogen halide, preferably hydrogen chloride, can also be used, since these catalysts are readily removed from the reaction system during solid-state polymerization.

In order to effectively accomplish the method for producing a liquid crystalline polyester of the present invention, a conventionally proposed metallic catalyst suitable for production of a liquid crystalline polyester can be used in such an amount that the stability and hue are not deteriorated.

Examples of the above metallic catalyst include alkali metals such as lithium, sodium, and potassium; alkaline earth metals such as calcium and magnesium; other metals such as aluminum, antimony, germanium, titanium, and tin; and metallic compounds thereof such as oxides, hydroxides, chlorides, and organic acid salts. Specific examples include magnesium acetate hydrate, potassium acetate, calcium acetate, lithium acetate, and tetrabutyl titanate.

In the prepolymer production step, the metallic catalyst is used in an amount of 200 ppm or less, preferably 0–100 ppm, by weight as reduced to a metallic element based on the produced prepolymer. When the amount is in excess of 200 ppm, side reaction such as branch formation occurs, resulting in deterioration in hue or physical properties.

When the liquid crystalline polyester is produced through melt polymerization, the viscosity of the melt increases with an increase in the polymerization degree of the formed polymer. When the polymerization is further continued, the viscosity suddenly increases, and finally, stirring of the polymerized matter through a routine stirring operation becomes impossible. Since increase in viscosity occurs suddenly, elevation of polymerization temperature cannot catch up with the increase in viscosity. Thus, the content of the polymerizer is solidified although polymerization is still incomplete.

In addition, monomers used for synthesizing a liquid crystalline polyester are generally sublimable substances. Thus, during melt polymerization carried out at high temperature, these monomers adhere onto the walls of a polymerization tank or a piping system under reduced pressure, thereby causing difficulty in controlling the compositional proportions of the produced liquid crystalline polyester to desired values.

As described above, a polymer having a desired polymerization degree is difficult to produce through only a melt polymerization step. Thus, a polymer (prepolymer) which has been obtained through a melt polymerization step is required to be polymerized in a solid state, to thereby further promote polymerization so as to attain a desired polymerization degree. Accordingly, the present invention employs a two-stage polymerization method including a prepolymer production step (1) and a solid-state polymerization step (2) for elevating the polymerization degree of the resultant prepolymer.

In the case of a all-aromatic type polyester, considerable difficulty is encountered in employing a polymerization method in which the polymerization temperature is elevated to a level higher than the melting temperature of a high-polymerization-degree polymer, to thereby melt the polymer, and polymerization is continued in a molten state until completion of the polymerization. This is because the melting temperature of the polymer of a desired polymerization degree is considerably high and is close to the decomposition temperature of the polymer.

Prepolymer Production Step

In the present invention, a liquid crystalline polyester prepolymer is produced, for example, in the following manner. Raw material monomers of interest, an acylating agent, a catalyst, etc. are placed into a reactor equipped with an agitator having a torque meter, a temperature-control indicator, an argon gas conduit, and a condenser. The reactor is purged with an inert gas such as argon, and the mixture is acylated.

In a first step; i.e., a prepolymer synthesis step, polymerization is performed under conditions such that the prepolymer contained in the reactor has an intrinsic viscosity $[\eta]$ of 0.2–3.0 dl/g, preferably 0.3–2.0 dl/g, and the polymerization temperature at the final stage of prepolymer synthesis is not lower than the melting point of the prepolymer.

In the above reaction, the acid anhydride (E) acylates hydroxyl groups, particularly phenolic hydroxyl groups, contained in raw material monomers. During acylation, an aliphatic carboxylic acid such as acetic acid is by-produced. The thus-produced aliphatic carboxylic acid is typically removed from the reaction system through distillation or a similar method, and subsequently the content is removed from the reactor, to thereby yield a prepolymer.

The thus-yielded prepolymer has a terminal group composition that almost accords with the composition of the fed monomers.

However, the present inventors have found that aromatic carboxylic acid terminal groups derived from an aromatic hydroxycarboxylic acid such as p-hydroxybenzoic acid undergo decarbonation in a high-temperature molten state, to thereby form aromatic ring terminal groups such as phenyl groups, and that the rate of subsequently performed solid-state polymerization increases with an increase in the number of aromatic ring terminal groups.

The percent transformation of aromatic carboxyl terminal groups into aromatic ring terminal groups, shown in the aforementioned equation (i), is 7% or more based on the theoretical number of total aromatic carboxyl terminal groups (i.e., aromatic carboxyl terminal groups provided that no decarbonation occurs), preferably 10% or more, more preferably 15% or more. The percent transformation can be elevated to 30%.

Transformation of carboxyl terminal groups into aromatic ring terminal groups is preferably carried out after reaction through maturing under predetermined conditions and in the presence of a polymerization catalyst for producing a prepolymer.

After completion of polymerization to produce a prepolymer, the percent transformation of aromatic carboxyl terminal groups into aromatic ring terminal groups is generally 5% or less based on the theoretical number of total aromatic carboxyl terminal groups. However, the percent transformation increases to the aforementioned level through maturing under predetermined conditions carried out after the polymerization.

The present invention employs a maturing step performed under a predetermined temperature and for a predetermined time, while the intrinsic viscosity $[\eta]$ of the prepolymer, as measured in pentafluorophenol at 60° C., is maintained at 0.2–3.0 dl/g, preferably 0.3–2.0 dl/g. The maturing step is performed, for example, for 1 minute to five hours, while agitation is weakened or stopped (to attain a stationary state) within final melt polycondensation temperature ±10° C., preferably ±5° C.; and under reduced pressure, normal pressure, a pressurized condition, or a gas flow at any pressure.

When maturing is performed under reduced pressure, the lower limit of the pressure is preferably the minimum pressure applied to melt polycondensation, and the upper limit thereof is preferably 650 mmHg (86,500 Pa), more preferably 500 mmHg (66,500 Pa), particularly preferably 300 mmHg (39,900 Pa). When the pressure is lower than the aforementioned lower limit, the molecular weight of the produced prepolymer increases, resulting in failure to obtain a prepolymer of a desired molecular weight, and the melt viscosity of the prepolymer increases, sometimes causing difficulty in removal of the prepolymer in a molten state from the bottom of a conventionally employed vertical polymerizer.

In the case in which control of the pressure to a predetermined value for maturing is preferred after termination of melt polycondensation, gas may be supplied. Examples of the employable gas include air, nitrogen, oxygen, carbonic gas, and argon. Of these, an inert gas such as nitrogen or argon is preferred, in that the gas is inert to the polymer at high temperature and tends to cause no deterioration of polymer due to heat, oxidation, etc.

Upon maturing after termination of polycondensation, instead of or in addition to treatment under reduced pressure, passage of a gas in the reactor is also preferred. Through passage of a gas, a gas generated from the polymer can be removed from the system. In addition, released components generated during polymerization and remaining in the vapor phase can also be removed from the system. The aforementioned gases may be employed as passage gas, and an inert gas such as nitrogen or argon is preferred. The amount of passage of the gas is preferably 0.1–100 L/minute, more preferably 0.5–50 L/minute. When the amount is small, the effect of removing a gas generated from the polymer and released components generated during polymerization and remaining in the vapor phase decreases, whereas when the amount is excessively large, the inside temperature of the reactor is lowered and the melt viscosity of the polymer increases, causing difficulty in removal of the polymer in a molten state from the bottom of the reactor and elevating costs.

When maturing is performed under pressurized conditions, the lower limit of the pressure is preferably the minimum pressure applied to melt polycondensation, and the upper limit thereof is preferably 5.0 kg/cm$^2$ (490,000 Pa), more preferably 2.0 kg/cm2 (196,000 Pa), particularly preferably 1.0 kg/cm$^2$ (98,000 Pa). When the pressure is excessively high, the effect of gas removal decreases, and gas foam remains in polymer strands during removal from the reactor. The gas foam disadvantageously blisters strands, possibly causing deterioration of the form of prepolymer pellets and decrease in yield of the prepolymer. The aforementioned gases may be employed as the passage gas, and an inert gas such as nitrogen or argon is preferred.

No particular limitation is imposed on the time for maturing after termination of melt polycondensation, and the time is one minute to five hours, preferably three minutes to two hours, particularly preferably five minutes to one hour. When the time is short, the produced polymer remains in the upper portion of the polymerizer, causing retardation of removal speed, resulting in possible reduction in the final removal amount.

In contrast, a longer time for maturing may cause reduction in molecular weight of the polymer and coloring of the polymer.

The time for treatment under reduced pressure, reduced pressure with gas passage, and/or pressurized conditions during maturing after termination of the aforementioned melt polycondensation is selected from a range of one minute to a time required for maturing, preferably five minutes to one hour. Treatment under reduced pressure or pressurized conditions may be carried out simultaneously with or independent of gas passage. In addition, the treatment and the gas passage may be partially overlapped for a certain period.

The prepolymer has a melting point falling within a range of 200–450° C., preferably 250–400° C. Such a prepolymer is preferred, in that the polymer can be readily removed from the reactor and transferred to the subsequent solid-state polymerization step (2) for producing a polymer in a solid state.

In order to synthesize a prepolymer in the aforementioned manner, a one-stage synthesis method or a multi-stage synthesis method involving 2 or more steps may be employed. In the present invention, prepolymer synthesis is carried out at a temperature where the synthesis temperature at the final step of prepolymer synthesis (i.e., the first step in the case of one-stage, the final step in the case of multi-stage) is not less than the melting point of the prepolymer. More preferably, the synthesis temperature is 250–450° C., particularly preferably 300–400° C.

When the prepolymer is synthesized under such temperature conditions, the produced prepolymer can be removed readily from the reactor and transferred to the solid-state polymerization step (2). When the prepolymer is synthesized at high temperature; e.g., higher than 400° C., physical properties of a liquid crystalline polyester produced from the prepolymer tend to be deteriorated.

The prepolymer synthesis is typically carried out for approximately 0.3–8.0 hours, preferably approximately 0.5–4 hours. During the reaction, the aliphatic carboxylic acid anhydride is preferably used in an amount of 1.02–1.08 to relevant phenolic hydroxyl group equivalent. As mentioned above, when the aliphatic carboxylic acid anhydride for acylating phenolic hydroxyl groups is used in an amount less than 1.02 times to hydroxyl group equivalent, the equilibrium at acylation is shifted to the aliphatic carboxylic acid anhydride side and raw materials sublimate during polymerization for producing a polyester. In this case, the reaction system tends to be clogged. When the amount exceeds 1.08 times to hydroxyl group equivalent, the produced polyester tends to be heavily colored, and characteristics of the resin obtained from the polyester are deteriorated.

Polymerization Step (Solid-state Polymerization Step)

In the second step, the prepolymer which has been obtained in the first step is removed from a first (melt polymerization) reactor and transferred to a second (solid-state polymerization) reactor. While disposed in the second reactor, the prepolymer is allowed to polymerize at a temperature not higher than the melting point of the prepolymer, preferably at a temperature lower than the melting point of the prepolymer by 20–80° C., to thereby produce a liquid crystalline polyester having an intrinsic viscosity [η] of 2.0–10.0 dl/g, preferably 2.5–8.0 dl/g.

In the second step, the produced prepolymer in the form of pellets, powder, or flakes is transferred to the second reactor (solid-state polymerizer) with or without mechanically pulverizing or crushing, and is allowed to solid-state-polymerize at a temperature at which melt-adhesion of solid matter does not occur. Alternatively, the prepolymer may be mechanically pulverized or may be pelletized by means of an extruder connected directly to the polymerizer, and the thus-processed prepolymer is supplied for solid-state polymerization.

Examples of the solid-state polymerizer which can be used include a multi-stage oven, and a rotatable heating drum such as a rotary oven hopper.

The solid-state polymerization step can be carried out in any of a batch manner, a semi-batch manner, and a continuous manner. Of these, a continuous manner is preferred, from the viewpoints of operational simplicity and costs.

In some cases, the above solid-state polymerization may be carried out under reduced pressure. In order to promote polymerization, the polymerization is preferably carried out under passage of an inert gas such as nitrogen. Alternatively, flow of dry air leads to production of a cross-linked polymer having a high polymerization degree.

The ratio of the mass of the inert gas to that of the liquid crystalline polymer; i.e., (mass of gas)/(mass of resin), preferably falls within a range of 0.75 to 20.

When the prepolymer in the form of pellets is placed in the solid-state polymerizer, the pellets are preferably heated under reduced pressure so as to enhance the molecular weight. In order to perform solid-state polymerization as uniformly as possible, the dimensions of the pellets are preferably controlled to 2 cm or less in diameter and 2 cm or less in length. However, pellets of 3 mm or less are not preferred, because handling of the powder-like pellets is becomes difficult due to the occurrence of bridge formation, dispersion, etc. during solid-state polymerization and transfer of the pellets.

The solid-state polymerization temperature is 200–400° C., preferably 250–380° C.

When the prepolymer is further polymerized at a temperature falling within the above range, the produced liquid crystalline polyester tends to have excellent heat resistance, excellent mechanical properties such as flexural modulus and tensile strength, and excellent melt-moldability.

The polyester having an intrinsic viscosity falling within the aforementioned range is endowed with excellent heat resistance and mechanical properties such as flexural rigidity and tensile strength and has excellent melt-moldability. Thus, molded products and fiber obtained from the polyester tend to have high heat resistance.

In the present invention, although the time for solid-state polymerization of the prepolymer to produce a liquid crystalline polyester varies in accordance with reaction conditions and other factors and cannot be specifically determined, typically the time is approximately 1–40 hours. In the aforementioned manner, the liquid crystalline polyester can be produced by two steps.

Such a liquid crystalline polyester, particularly such an aromatic all-aromatic type liquid crystalline polyester, has an intrinsic viscosity [η] of 10.0 dl/g or less, preferably 2.0–8.0 dl/g, more preferably 2.5–7.0 dl/g, and a melting point of 200–450° C., preferably 250–400° C.

The aforementioned all-aromatic type polyester according to the present invention preferably has a substantially linear shape. Any monomer unit may occupy the molecular terminals of the polyester.

By use of a customary method, a carboxyl terminal group of a polyester molecule may be esterified with a monohydric, lower alcohol such as methanol, ethanol, or isopropanol; or with a monohydric, aromatic hydroxy compound such as phenol or cresol, and a hydroxyl terminal group of a polyester molecule may be esterified with a monobasic carboxylic acid such as acetic acid, propionic acid, or benzoic acid.

In the method for producing a liquid crystalline polyester of the present invention, upon polymerization, additives such as a stabilizer, a colorant, and a filler may be added in certain amounts, so long as the additives do not impair or deteriorate the effect of the present invention. Examples of the filler include silica, powder quartz, sand, fumed silica, silicon carbide, aluminum oxide, glass fiber, and mixtures thereof.

The liquid crystalline polyester produced according to the present invention can be used as a resin composition prepared by adding a variety of additives.

Fibrous, granular, and plate-like inorganic fillers may be incorporated as the above additives in accordance with purposes. Examples of fibrous fillers include inorganic fibrous fibers. Specific examples include glass fiber, asbestos fiber, silica fiber, silica-alumina fiber, alumina fiber, zirconia fiber, boron nitride fiber, silicon nitride fiber, boron fiber, potassium titanate fiber, and metallic fibers such as stainless steel fiber, aluminum fiber, titanium fiber, copper fiber, and brass fiber.

Examples of granular fillers include carbon black; graphite; silica; quartz powder; glass beads; milled glass fiber; glass balloons; glass powder; silicate salts such as calcium silicate, aluminum silicate, kaolin, talc, clay, diatomaceous earth, and wollastonite; metal oxides such as iron oxide, titanium oxide, zinc oxide, antimony trioxide, and alumina; metal carbonate salts such as calcium carbonate and magnesium carbonate; metal sulfate salts such as calcium sulfate and barium sulfate; ferrite; silicon carbide; silicon nitride; boron nitride; and metallic powders.

Examples of plate-like fillers include mica, glass flakes, and a variety of metals in the form of foil. These inorganic fillers may be used singly or in combination of two or more species.

These inorganic fillers may be employed in combination with any of known surface-treatment agents, in accordance with intended physical properties. Examples of surface-treatment agents include functional compounds such as epoxy compounds, isocyanate compounds, titanate compounds, and silane compounds. An inorganic filler, which has been treated with a surface-treatment agent other than an amino compound such as an epoxy compound and a polyamide compound, is preferred.

The inorganic fillers are added in a total amount of 1–300 parts by weight based on 100 parts by weight of the aforementioned liquid crystalline polyester. Upon use of these inorganic fillers, the fillers may be surface-treated in advance or may be added simultaneously with a surface-treatment agent during preparation of material.

Other thermoplastic resins may be added to the aforementioned liquid crystalline polyester resin composition, in accordance with purposes.

No particular limitation is imposed on the thermoplastic resins which are added to the resin composition. Examples of the thermoplastic resins include aromatic polyesters such as polyethylene terephthalate, polybutylene terephthalate, polyethylene naphthalate, and polybutylene naphthalate; polyolefins such as polyethylene and polypropylene; polyacetals (homopolymer and copolymer); polystyrene, styrene-butadiene copolymers, acrylonitrile-butadiene-styrene copolymers, styrene-butadiene-acrylic acid (or its ester) copolymers, and acrylonitrile-styrene copolymers; polyvinyl chloride; polyamides; poly(phenylene oxide); poly(phenylene sulfide); polysulfones; polyether-sulfones; polyketones; polyether-ketones; polyimides; polyether-imides; polybenzimidazole; polybutadiene and butyl rubber; silicone resins; fluororesins; olefin-based thermoplastic elastomers, styrene-based thermoplastic elastomers, urethane-based thermoplastic elastomers, polyester-based thermoplastic elastomers, polyamide-based thermoplastic elastomers, and polyether-based thermoplastic elastomers; polyacrylate-based, core-shell type, multi-layered graft copolymers; and modified products thereof. These thermoplastic resins may be used in combination of two or more species.

To the aforementioned composition, generally known additives for resin for incorporation into thermoplastic and thermosetting resins; i.e., stabilizers such as an anti-oxidant and a UV-absorber, an anti-static agent, a fire-retardant, colorants such as a dye and a pigment, and a lubricant, may be appropriately added in accordance with desired performance.

The aforementioned resin composition can be prepared by use of an apparatus and method that are generally employed for preparing a synthetic resin composition. For example, essential components are kneaded and extruded by use of a single or double screw extruder, to thereby yield pellets for molding. Alternatively, a portion of essential components may be mixed to yield a master batch, followed by molding. In another format, a portion or the entirety of a liquid crystalline polyester is pulverized so as to enhance the dispersion state of mixed components, and the resultant melt-mixture is extruded. Any of these procedures and similar methods can be carried out. Also usable is a method in which fiber or a similar material is added to resin components in a molten state during a melt-extrusion step. This method fully attains its effect, in that damage of fibrous fillers can be minimized.

The thus-obtained pellets of the liquid crystalline polyester are molded through any known molding method generally applied to thermoplastic resin, such as injection molding, extrusion, vacuum forming, and compression molding, to thereby yield molded products. Among these methods, injection molding is most preferred.

The liquid crystalline polyester obtained according to the present invention has excellent properties such as heat resistance, resistance to hydrolysis at high temperature, and dimensional stability; excellent mechanical properties such as flexural rigidity, tensile strength, and impact strength; and excellent melt-moldability. According to the present invention, a liquid crystalline polyester exhibiting anisotropy in a molten state can be produced in a short time and at low cost.

Through employment of a melt molding method such as injection molding, extrusion, or compression molding, liquid crystalline polymers having the aforementioned characteristics have found industrial uses; e.g., as materials for producing mechanical parts; materials for producing electric and electronic parts such as connectors, relays, and bobbins; materials for producing ICs or similar devices; materials for producing vertical and horizontal exterior panels for automobiles; materials for producing automobile parts; materials for producing containers such as trunks and cases; film; sheets; and fiber.

EXAMPLES

The present invention will next be described in more detail by way of examples, which should not be construed as limiting the invention thereto.

The produced polyesters were evaluated in the following manner.

Melting Point

Through employment of a differential scanning calorimeter (DSC, Model II, product of Perkin-Elmer), a liquid crystalline polyester sample (approximately 10 mg) was heated from 50° C. to 450° C. at 20° C./min; cooled to 50° C. at 20° C./min; and heated again to 450° C. at 20° C./min, and an endothermic thermogram was recorded. The melting point (° C.) of the sample was obtained from the second endothermic peak.

Melt Viscosity

The melt viscosity of a polymer sample was measured by means of a melt viscometer (Capillograph 1B, product of Toyo Seiki) by use of a capillary (1 mm $\phi \times 20$ mm) at a shear rate of 1,000/sec. The measurement was performed within a temperature range of the melting point of the polymer sample plus 10° C. to the melting point plus 30° C.

Terminal Group Analysis

Terminal group analysis was carried out in accordance with the aforementioned analysis method employing amine decomposition (terminal group analysis method: "New terminal group analysis method and number average molecular weight of LCP," Resume of Lectures, Vol. 44, No. 4, 577 (1995); The Society of Polymer Science, Japan).

Example 1

Into a reactor (capacity: 6 L) equipped with an agitator having a torque meter, a temperature-control indicator, an argon gas conduit, and a condenser, there were placed p-hydroxybenzoic acid (1,379 g), 6-hydroxy-2-naphthoic acid (188 g), terephthalic acid (470 g), 4,4'-dihydroxybiphenyl (372 g), p-acetylaminophenol (126 g), acetic anhydride (1,711 g) (1.06 times to hydroxyl group equivalent), and potassium acetate serving as a catalyst (0.33 g) (60 ppm by weight as reduced to metallic K based on the resin to be formed). The reactor was purged with argon, and the reaction system was heated to 140° C. The mixture was allowed to react for 1 hour for acetylation. Subsequently, the temperature was elevated to 340° C. at approximately 2° C./min while by-produced acetic acid was removed through distillation, and the reaction mixture was maintained for one hour under reduced pressure. The torque of the agitator was increased to a predetermined value.

While the temperature condition was maintained, agitation was terminated, and nitrogen was introduced into the reactor so as to convert reduced pressure conditions to atmospheric pressure. Subsequently, the reaction mixture was allowed to stand for 0.5 hours for maturing.

The content of the reactor was removed, and pellets of a prepolymer were obtained.

The thus-obtained prepolymer was found to have an intrinsic viscosity [η] of 1.10 dl/g and a melting point of 320° C. The prepolymer was found to have a ratio of the number of terminal phenyl groups to the total number of terminal phenyl groups and terminal carboxyl groups, shown in equation (i), of 15%.

The pellets of the prepolymer were placed in an oven for carrying out solid-state polymerization at normal pressure. Under nitrogen flow at 12 L/min, the temperature was elevated from room temperature to 280° C. over two hours, and the pellets were allowed to solid-state-polymerize at 280° C. for 15 hours. The thus-obtained liquid crystalline polyester assumed a powder cake form, but could be disintegrated easily to form pellets; i.e., the form before solid-state polymerization, without causing strong solidification by fusion. The polyester was found to have an intrinsic viscosity [η] of 7.38 (dl/g) and a melt viscosity (at 360° C.) of 41 Pa·sec. The melting point of the polyester, as measured through DSC, was found to be 341° C., and no glass transition temperature (Tg) was confirmed. Observation of the content under a polarizing microscope equipped with a heat stage revealed that the polyester exhibited anisotropy in a molten state.

Example 2

The procedure of Example 1 was repeated, except that a prepolymer obtained through prepolymer production reaction was allowed to stand for one hour.

The thus-yielded prepolymer was found to have an intrinsic viscosity [η] of 1.10 dl/g and a melting point, as measured through DSC, of 320° C. The prepolymer was found to have a ratio of the number of terminal phenyl groups to the total number of terminal phenyl groups and terminal carboxyl groups, shown in equation (i), of 21%.

In a manner similar to that of Example 1, the above prepolymer in a form of pellets was solid-state-polymerized, to thereby yield a polyester. The polyester was found to have an intrinsic viscosity [η] of 8.65 (dl/g) and a melt viscosity (at 360° C.) of 45 Pa·sec. The melting point of the polyester, as measured through DSC, was found to be 341° C., and no glass transition temperature was confirmed. Observation of the content under a polarizing microscope equipped with a heat stage revealed that the polyester exhibited anisotropy in a molten state.

Comparative Example 1

The procedure of Example 1 was repeated, except that a prepolymer obtained through prepolymer production reaction was not allowed to stand. The thus-yielded prepolymer was found to have an intrinsic viscosity [η] of 1.10 dl/g and a melting point of 320° C. The prepolymer was found to have a ratio of the number of terminal phenyl groups to the total number of terminal phenyl groups and terminal carboxyl groups, shown in equation (i), of 4%.

In a manner similar to that of Example 1, the above prepolymer in a form of pellets was solid-state-polymerized, to thereby yield a polyester. The polyester was found to have an intrinsic viscosity [η] of 6.21 (dl/g) and a melt viscosity (at 360° C.) of 32 Pa·sec. The melting point of the polyester was found to be 336° C., and no glass transition temperature was confirmed. Observation of the content under a polarizing microscope equipped with a heat stage revealed that the polyester exhibited anisotropy in a molten state.

Example 3

The procedure of Example 1 was repeated, except that p-hydroxybenzoic acid (1,843 g), 6-hydroxy-2-naphthoic acid (636 g), terephthalic acid (28 g), acetic anhydride (1,810 g) (1.06 times to hydroxyl group equivalent), and potassium acetate serving as a catalyst (0.33 g) (60 ppm by weight as reduced to metallic K based on the resin to be formed) were used, to thereby yield a prepolymer. The thus-yielded prepolymer was found to have an intrinsic viscosity [η] of 1.02 dl/g and a melting point of 324° C. The prepolymer was found to have a ratio of the number of terminal phenyl groups to the total number of terminal phenyl groups and terminal carboxyl groups, shown in equation (i), of 13%.

In a manner similar to that of Example 1, the above prepolymer in a form of pellets was solid-state-polymerized, to thereby yield a polyester. The polyester was found to have an intrinsic viscosity [η] of 6.78 (dl/g) and a melt viscosity (at 350° C.) of 33 Pa·sec. The melting point of the polyester was found to be 322° C., and no glass transition temperature was confirmed. Observation of the content under a polarizing microscope equipped with a heat stage revealed that the polyester exhibited anisotropy in a molten state.

Comparative Example 2

The procedure of Example 3 was repeated, except that a prepolymer obtained through prepolymer production reaction was not allowed to stand. The thus-yielded prepolymer was found to have an intrinsic viscosity [η] of 1.02 dl/g and a melting point of 323° C. The prepolymer was found to have a ratio of the number of terminal phenyl groups to the total number of terminal phenyl groups and terminal carboxyl groups, shown in equation (i), of 4%.

In a manner similar to that of Example 1, the above prepolymer in a form of pellets was solid-state-polymerized, to thereby yield a polyester. The polyester was found to have an intrinsic viscosity [η] of 5.34 (dl/g) and a melt viscosity (at 350° C.) of 25 Pa·sec. The melting point of the polyester was found to be 322° C., and no glass transition temperature was confirmed. Observation of the content under a polarizing microscope equipped with a heat stage revealed that the polyester exhibited anisotropy in a molten state.

Example 4

The procedure of Example 1 was repeated, except that p-hydroxybenzoic acid (1,340 g), 6-hydroxy-2-naphthoic acid (183 g), 4,4'-dihydroxybiphenyl (512 g), terephthalic acid (457 g), acetic anhydride (1,750 g) (1.06 times to hydroxyl group equivalent), and potassium acetate serving as a catalyst (0.33 g) (60 ppm by weight as reduced to metallic K based on the resin to be formed) were used, to thereby yield a prepolymer of a liquid crystalline polyester. The thus-yielded prepolymer was found to have an intrinsic viscosity [η] of 1.11 dl/g and a melting point of 321° C. The prepolymer was found to have a ratio of the number of terminal phenyl groups to the total number of terminal phenyl groups and terminal carboxyl groups, shown in equation (i), of 17%.

In a manner similar to that of Example 1, the above prepolymer in a form of pellets was solid-state-polymerized, to thereby yield a polyester. The polyester was found to have an intrinsic viscosity [η] of 7.54 (dl/g) and a melt viscosity (at 360° C.) of 42 Pa·sec. The melting point of the polyester was found to be 341° C., and no glass transition temperature was confirmed. Observation of the content under a polarizing microscope equipped with a heat stage revealed that the polyester exhibited anisotropy in a molten state.

Comparative Example 3

The procedure of Example 4 was repeated, except that a prepolymer obtained through prepolymer production reaction was not allowed to stand. The thus-yielded prepolymer was found to have an intrinsic viscosity [η] of 1.11 dl/g and a melting point of 321° C. The prepolymer was found to have a ratio of the number of terminal phenyl groups to the total number of terminal phenyl groups and terminal carboxyl groups, shown in equation (i), of 5%.

In a manner similar to that of Example 1, the above prepolymer in a form of pellets was solid-state-polymerized, to thereby yield a polyester. The polyester was found to have an intrinsic viscosity [η] of 6.53 (dl/g) and a melt viscosity (at 360° C.) of 36 Pa·sec. The melting point of the polyester was found to be 339° C., and no glass transition temperature (Tg) was confirmed. Observation of the content under a polarizing microscope equipped with a heat stage revealed that the polyester exhibited anisotropy in a molten state.

Example 5

The prepolymer in the form of pellets yielded in a manner as employed in Example 1 was fed to a continuous solid-state polymerizer equipped with a hopper, from the top of the polymerizer at 15 kg/hour. The prepolymer was allowed to reside in the polymerizer for 15 hours for solid-state polymerization, and the produced matter was discharged at 15 kg/hour from the bottom of the polymerizer. Nitrogen serving as an inert gas was fed at a gas feed ratio of 1 (i.e., at a nitrogen flow of 15 kg/hour) from the bottom of the polymerizer and was discharged from the top of the polymerizer. The reaction temperature was controlled by elevating the temperature of a jacket and that of nitrogen to 290° C.

The thus-produced polyester was found to have an intrinsic viscosity [η] of 7.11 (dl/g) and a melt viscosity (at 360° C.) of 40 Pa·sec. The melting point of the polyester was found to be 345° C. Observation of the produced polymer under a polarizing microscope equipped with a heat stage revealed that the polyester exhibited anisotropy in a molten state.

Example 6

The prepolymer in the form of pellets yielded in a manner as employed in Example 2 was fed to a continuous solid-state polymerizer equipped with a hopper, from the top of the polymerizer at 15 kg/hour., The prepolymer was allowed to reside in the polymerizer for 15 hours for solid-state polymerization, and the produced matter was discharged at 15 kg/hour from the bottom of the polymerizer. Nitrogen serving as an inert gas was fed at a gas feed ratio of 1 (i.e., at a nitrogen flow of 15 kg/hour) from the bottom of the polymerizer and was discharged from the top of the polymerizer. The reaction temperature was controlled by elevating the temperature of a jacket and that of nitrogen to 290° C.

The thus-produced polyester was found to have an intrinsic viscosity [η] of 8.55 (dl/g) and a melt viscosity (at 360° C.) of 45 Pa·sec. The melting point of the polyester was found to be 347° C. Observation of the produced polymer under a polarizing microscope equipped with a heat stage revealed that the polyester exhibited anisotropy in a molten state.

Comparative Example 4

The polymerization procedure of Example 5 was repeated, except that a prepolymer in the form of pellets obtained in a manner similar to that employed in Comparative Example 1 was used. The thus-produced polyester was found to have an intrinsic viscosity [η] of 6.29 (dl/g) and a melt viscosity (at 360° C.) of 33 Pa·sec. The melting point of the polyester was found to be 338° C. Observation of the produced polymer under a polarizing microscope equipped with a heat stage revealed that the polyester exhibited anisotropy in a molten state.

Industrial Applicability

According to the present invention, a first prepolymer production step is performed through melt polymerization, followed by a maturing step, and a second polymerization step is performed through solid-state polymerization. Thus, a liquid crystalline polyester exhibiting anisotropy while in a molten state can be produced within a short time and at low cost.

What is claimed is:

1. In a method for producing a liquid crystalline polyester comprising at least an aromatic dicarboxylic acid (a), an aromatic diol (b), an aromatic hydroxycarboxylic acid (c), and/or an aromatic hydroxylamine (d) and exhibits anisotropy when stationary in a molten state, the method comprising:

a polymerization step (1) for producing a prepolymer of the liquid crystalline polyester which is obtained by acylating a phenolic-hydroxyl-group of a phenolic-hydroxyl-group-containing aromatic compound by employing an aliphatic carboxylic acid anhydride (E) in an amount of 1.02–1.08 times to hydroxyl group equivalent of the phenolic-hydroxyl-group-containing aromatic compound, heating by elevating a temperature, performing a melt polymerization at a temperature higher or equal to a melting point of a prepolymer to be obtained, performing a maturing step to decarbonate a carboxyl group of a terminal aromatic hydroxycarboxylic acid (c) of a prepolymer so as to satisfy the following equation (i):

[(the number of aromatic ring terminal groups)/[(the number of carboxylic terminal groups)+(the number of aromatic ring terminal groups)]×100≧7(%)    (i), and a solid-state polymerization step (2) for elevating the polymerization degree of the resultant prepolymer.

2. A method for producing a liquid crystalline polyester as described in claim 1, wherein the aromatic hydroxycarboxylic acid (c) is p-hydroxybenzoic acid and/or 2-hydroxy-6-carboxynaphthalene.

3. A method for producing a liquid crystalline polyester as described in claim 1, wherein the liquid crystalline polyester is a liquid crystalline all-aromatic type polyester including at least p-hydroxybenzoic acid.

4. A method for producing a liquid crystalline polyester as described in claim 1, wherein the aliphatic carboxylic acid anhydride (E) is acetic anhydride.

5. A method for producing a liquid crystalline polyester as described in claim 1, wherein polymerization for producing the prepolymer is performed in the presence of a metallic catalyst in an amount of 200 ppm or lower by weight as reduced to a metallic element based on the prepolymer.

6. A method for producing a liquid crystalline polyester as described in claim 1, wherein the prepolymer has an intrinsic viscosity [η], as measured in pentafluorophenol at 60° C., of 0.2–3.0 dl/g.

7. A method for producing a liquid crystalline polyester as described in claim 1, wherein the solid-state polymerization step (2) is performed at 200–400° C.

8. A method for producing a liquid crystalline polyester as described in claim 1, wherein the liquid crystalline polyester has an intrinsic viscosity [η], as measured in pentafluorophenol at 60° C., of 2.0–10.0 dl/g.

9. A method for producing a liquid crystalline polyester as described in claim 1, wherein the maturing step for controlling the number of aromatic ring terminal groups is conducted so as to satisfy the equation (i) while the intrinsic viscosity [η] of the prepolymer, as measured in pentafluorophenol at 60° C., is maintained at 0.2–3.0 dl/g and subsequently, the solid-state polymerization step (2) is performed.

10. A method for producing a liquid crystalline polyester as described in claim 9, wherein the maturing step is performed while agitation is weakened or stopped, within a temperature range of a final polymerization temperature ±10° C. for producing the prepolymer; and under reduced pressure, normal pressure, or a pressurized condition, or a gas flow at any pressure.

* * * * *